United States Patent
Baker et al.

[11] Patent Number: 6,128,165
[45] Date of Patent: Oct. 3, 2000

[54] ACTUATOR ASSEMBLY ATTACHMENT IN A DISC DRIVE

[75] Inventors: Jon P. Baker, Oklahoma City; Phillip R. Ridenour, Mustang; Jeffrey D. Andress, Edmond, all of Okla.

[73] Assignee: Seagate Technology, Inc., Scotts Valley, Calif.

[21] Appl. No.: 09/085,237

[22] Filed: May 27, 1998

Related U.S. Application Data

[60] Provisional application No. 60/063,262, Oct. 24, 1997.

[51] Int. Cl.[7] .................................................. G11B 5/55
[52] U.S. Cl. ........................................................ 360/265.6
[58] Field of Search ............................... 360/106, 265.2, 360/265.6

[56] References Cited

U.S. PATENT DOCUMENTS

| | | | |
|---|---|---|---|
| 3,874,751 | 4/1975 | Okubo et al. | 308/26 |
| 5,054,372 | 10/1991 | Weyer | 92/13.5 |
| 5,061,868 | 10/1991 | Iwazaki et al. | 310/67 R |
| 5,146,450 | 9/1992 | Brooks et al. | 369/244 |
| 5,404,636 | 4/1995 | Stefansky et al. | 29/603 |
| 5,482,381 | 1/1996 | Krum et al. | 384/480 |
| 5,523,911 | 6/1996 | Mita et al. | 360/106 |
| 5,539,595 | 7/1996 | Beck et al. | 360/97.01 |
| 5,768,063 | 6/1998 | Suwa et al. | 360/106 |
| 5,790,348 | 8/1998 | Alfred et al. | 360/106 |
| 5,801,899 | 9/1998 | Genheimer | 360/97.01 |
| 5,818,665 | 10/1998 | Malagrino, Jr. et al. | 360/106 |
| 5,867,348 | 2/1999 | Suwa | 360/106 |

*Primary Examiner*—Brian E. Miller
*Attorney, Agent, or Firm*—Crowe & Dunlevy

[57] ABSTRACT

An improved attachment of an actuator E-block of an actuator apparatus to a cartridge bearing assembly for a hard disc drive, the actuator apparatus having an E-block with a central bore having a pair of cartridge bearing alignment edges and a relief area, the cartridge bearing alignment edges disposed within the central bore to engage the cartridge bearing assembly. Mounting members extend through the wall of the E-block into the central bore to apply a frictional load there against and a compressive load against the cartridge bearing assembly sufficient to maintain contact between the cartridge bearing alignment edges of the E-block and the cartridge bearing assembly.

9 Claims, 4 Drawing Sheets

ACTUATOR ASSEMBLY ATTACHMENT IN A DISC DRIVE

RELATED APPLICATIONS

This application claims priority to provisional application Ser. No. 60/063,262 entitled OPTIMIZED ATTACHMENT FOR IMPROVED RESONANCE PERFORMANCE IN A DISC DRIVE PIVOT ASSEMBLY, filed Oct. 24, 1997.

FIELD OF THE INVENTION

The present invention relates generally to the field of disc drive data storage devices, and more particularly but not by way of limitation, to an improved attachment of a cartridge bearing assembly and an actuator assembly of a disc drive.

BACKGROUND

Hard disc drives are commonly used in a multitude of computer environments ranging from super computers through notebook computers to store large amounts of data in a form that can be made readily available to a user. Typically, a disc drive comprises one or more magnetic discs that are rotated by a spindle motor at a constant high speed. The surface of each disc is a data recording surface divided into a series of generally concentric recording tracks radially spaced across a band having an inner diameter and an outer diameter. Extending around the discs, the data tracks store data within the radial extent of the tracks on the disc surfaces in the form of magnetic flux transitions induced by an array of transducers, commonly called read/write heads. Typically, each data track is divided into a number of data sectors that store fixed sized data blocks.

The read/write head includes an interactive element such as a magnetic transducer which senses the magnetic transitions on a selected data track to read the data stored on the track. Alternatively, the read/write head transmits an electrical signal that induces magnetic transitions on the selected data track to write data to the track.

As is known in the art, each read/write head is mounted to a load arm that is supported by an actuator arm and is selectively positionable by a rotary actuator assembly over a selected data track of the disc to either read data from or write data to the selected data track. The read/write head includes a slider assembly having an air-bearing surface that causes the read/write head to fly above the data tracks of the disc surface. The air-bearing is developed as a result of load forces applied to the read/write head by the load arm interacting with air currents, produced by rotation of the disc.

Typically, a plurality of open-center discs and spacer rings are alternately stacked on the hub of a spindle motor. The hub, defining the core of the stack, serves to align the discs and spacer rings around a common centerline. Movement of the discs and spacer rings is typically constrained by placing the stack under a compressive load and maintaining the load by means of a clamp ring. Collectively the discs, spacer rings, clamp ring and spindle motor define a disc stack envelope or disc pack. The read/write heads are mounted on a complementary stack of actuator arms which comprise an actuator assembly which accesses the surfaces of the stacked discs of the disc pack. The actuator assembly generally includes a precision component, known to in the art as an "E-block," which provides a mounting for the voice coil, the load arms for the read/write heads, the flex circuit assembly, the cartridge bearing assembly and the read/write head wires.

The read/write head wires conduct electrical signals from the read/write heads to a flex circuit which conducts the electrical signals to a flex circuit connector. The flex circuit connector in turn is mounted to a flex circuit mounting bracket, and the mounting bracket is mounted to a disc drive basedeck. External to the basedeck the flex circuit connector is secured to a printed circuit board assembly (PCB). For a general discussion of actuator assembly techniques, see U.S. Pat. No. 5,404,636 entitled METHOD OF ASSEMBLING A DISC DRIVE ACTUATOR, issued to Stefansky et al., assigned to the assignee of the present invention.

The head-disc assembly (HDA) of a disc drive is typically assembled in a clean room environment. The need for maintaining a clean room environment (free of contaminants of 0.3 micron and larger) is to ensure that the head-disc interface remains unencumbered and damage free. The slightest damage to the surface of a disc or read/write head can result in a catastrophic failure of the disc drive. The primary causes of catastrophic failure, particularly read/write head crashes (a non-recoverable, catastrophic failure of the disc drive), are generally characterized as contamination, exposure to mechanically induced shock and non-shock induced damage. One common cause of non-shock induced damage is typically traced to the assembly process and generally stems from handling damage sustained by the HDA during the assembly process. Another cause of non-shock induced damage results from an inability to achieve the proper placement of the E-block relative to the datum of the cartridge bearing assembly. In many disc drives the cartridge bearing assembly's datum is the defining datum from which the balance of a disc drives mechanical components draw their reference.

Several factors that bear particularly on the problem of assembly process induced damage and misalignment are the physical size of the disc drive, the spacing of the components, the recording densities sought to be achieved and the level of precision to be maintained during the assembly process. The high levels of precision required by the assembly process are necessary to attain the operational tolerances required by the disc drive. The rigorous operational tolerances are in response to market demands that have driven the need to decrease the physical size of the disc drive, while simultaneously increasing the disc drive storage capacity and performance characteristics.

Demands on the disc drive mechanical components and assembly procedures have become increasingly more critical in order to support capability and size reduction in the face of the new market demands. Part-to-part variation in critical functional attributes in the magnitude of a micro-inch can result in disc drive failures. These factors are of particular importance when assembling the Actuator assembly. Misalignment of the E-block relative to the cartridge bearing assembly datum or interference between the cartridge bearing assembly and the E-block, to a level beyond the ability of the disc electronics to accommodate the variance, will result in disc drive failure.

Additionally, as disc drive designs continue to decrease in size, smaller read/write heads, thinner substrates, longer and thinner actuator arms and thinner gimbal assemblies continue to be incorporated into the drives. This trend significantly increases the need to improve HDA assembly processes and develop new mechanical designs conducive to producing consistent product as a natural outcome of executing the assembly process steps.

The progression of continually decreasing disc thickness and disc spacing, together with increasing track density and increasing numbers of discs in the disc pack, has resulted in a demand for tools, methods and robust designs of ever increasing sophistication. One result of the growth in demand for sophisticated HDA assembly processes has been a demand for more compliant mechanical designs that involve fewer critical alignments, while achieving ever-increasing levels of precision.

In addition to the difficulties faced in assembling, high capacity, complex disc drives, actual product performance requirements have dictated the need to develop new mechanical interfaces to ensure compliance with operating specifications. The primary factor driving more stringent demands on the mechanical components and HDA assembly process is the continually increasing areal densities and data transfer rates of the drives.

The continuing trend in the disc drive industry is to develop products with ever increasing areal densities, decreasing access times and increasing rotational disc pack speeds. These factors place greater demands on the ability of servo systems to control the position of read/write heads relative to the data tracks. This same trend makes disc drives much more susceptible to detrimental resonance frequencies, fly height variations of the read/write heads, overshoot of the read/write heads during seek operations and read/write head oscillation (collectively referred to as mechanically induced noise and instability).

By design, a disc drive typically has a discreet threshold level of resistance to withstand mechanically induced noise and instability, below which the servo system is not impaired and the read/write channel is able to function. The servo system can accommodate a finite level of detrimental resonance frequencies, overshoot of the read/write heads during seek operations or read/write head oscillation. The read/write channel can accommodate a less than nominal signal resulting from fly height variations of the read/write heads and discreet level of read/write head oscillation. The mechanical interface integrity between the E-block and cartridge bearing assembly of the actuator assembly is highly critical in minimizing and maintaining a low level of mechanically induced noise and instability that affects the servo system and read/write channel. Additionally, assuring mechanical interface integrity between the E-block and the cartridge bearing assembly in the form of mechanical alignment is essential in achieving the load forces required by the read/write head to ensure proper fly height for data exchanges.

The primary manifestations of mechanically induced noise and instability are: seek induced read/write head oscillation; resonance induced read/write head oscillation; resonance of the actuator at the servo systems crossover frequency; overshoot; and externally induced vibrations. Of these manifestations of mechanically induced noise and instability, read/write head oscillations, and externally induced vibrations are particularly pertinent to the present invention.

Read/write head oscillations are often introduced to the system via deformations or irregularities in the topology of the disc surface; harmonics induced into the actuator assembly by the rotating disc pack; and the resonance response of the actuator assembly to the levels of energy injected into the system. Relatively high levels of energy for a short duration of time are encountered by the disc drive during seek operations. It is common for a disc drive to encounter read/write head oscillations during seek operations. To deal with this phenomena most servo systems incorporate "settle time" to allow time for the oscillations to dampen out prior to turning on the read gate.

Resonant modes found to be problematic for read/write head stability are typically the domain of mechanical interface integrity issues between the E-block and the cartridge bearing assembly of the actuator assembly. Dealing with E-block to cartridge bearing assembly mechanical interface issues requires establishment of a highly controllable assembly process and incorporation of a compliant, robust mechanical design.

Prior art techniques of coupling the E-block and the cartridge bearing assembly have mostly become obsolete due to the ever increasing performance demands placed on disc drives. Prior art coupling techniques have included press-fitting, threading engagement of the cartridge bearing assembly with the E-block, adhesive bonding, and mounting hardware that is passed through the E-block and treaded into the cartridge bearing assembly. Of these, adhesive bonding and mounting hardware are currently finding the greatest acceptance.

With adhesives, the ability to selectively position the E-block relative to the cartridge bearing assembly is a distinct advantage. However, problems include the potential contamination of the bearings by the adhesive and the difficulty of adjusting the position of the E-block relative to the cartridge bearing assembly once the adhesive has cured. With mounting hardware, the position of the E-block relative to the cartridge bearing assembly requires a specific alignment of the threaded apertures of the cartridge bearing assembly and the mounting apertures of the E-block.

A problem common to both coupling approaches occurs as a result of the holding force used to secure the components being concentrated along one side of the cartridge bearing assembly. When employing an adhesive to secure the cartridge bearing assembly to the E-block, failure of the adhesive to wick around and fill the gap between the cartridge bearing assembly and the E-block results in gaps that allow excessive read/write head movement. The source of this movement is the inability of the E-block to cartridge bearing mechanical interface to maintain the position of the E-block relative to the cartridge bearing assembly when a seek operation introduces a torsion into the system. The occurrence of movement during seek operations, specifically short seeks, results in the read/write head traveling beyond the data track being sought. The response of the servo system to this condition is to drive the heads in the opposite direction. In such situations it is common that resonances are set up in the actuator assembly in response to the energy poured into the system driving the read/write heads to oscillate.

An analogous condition occurs when mounting hardware used to attach the E-block to the cartridge bearing assembly is attached in a manner that results in holding forces being concentrated on one side of the cartridge bearing assembly. The combination of the components in conjunction with localized holding forces has been found to propagate resonant modes contrary to optimum performance of the disc drive.

Disc drive performance degradating resonant modes, linked to localization of holding forces, evidence a need for an improved cartridge bearing assembly and E-block coupling for actuator assemblies in disc drives.

SUMMARY OF THE INVENTION

The present invention provides an improved attachment of an actuator E-block of an actuator apparatus to a cartridge bearing assembly for a hard disc drive.

The actuator apparatus of the present invention has an E-block member which has a central bore which is sized to be supported on the outer housing of a conventional cartridge bearing assembly, the central bore having a pair of cartridge bearing alignment edges and a relief area therebetween, the cartridge bearing alignment edges disposed to extend the length of the central bore and angularly separated to press against the outer housing of the cartridge bearing assembly when the E-block is supported thereon.

One or more containment members, such as mounting screws, extend through the wall of the E-block and extend into the central bore to apply a frictional load against the cartridge bearing assembly thereby pressing the cartridge bearing under compressive load against the cartridge bearing assembly sufficient to maintain line contact between the cartridge bearing alignment edges of the E-block and the cartridge bearing assembly.

The present invention balances the load forces about the perimeter of the cartridge bearing to prevent relative movement between the E-block and the cartridge bearing assembly to thereby maintain constant alignment between the E-block and the cartridge bearing assembly under operating loads, thus preventing or minimizing relative motion between the E-block and the cartridge bearing assembly.

DETAILED DESCRIPTION

Figure 1:
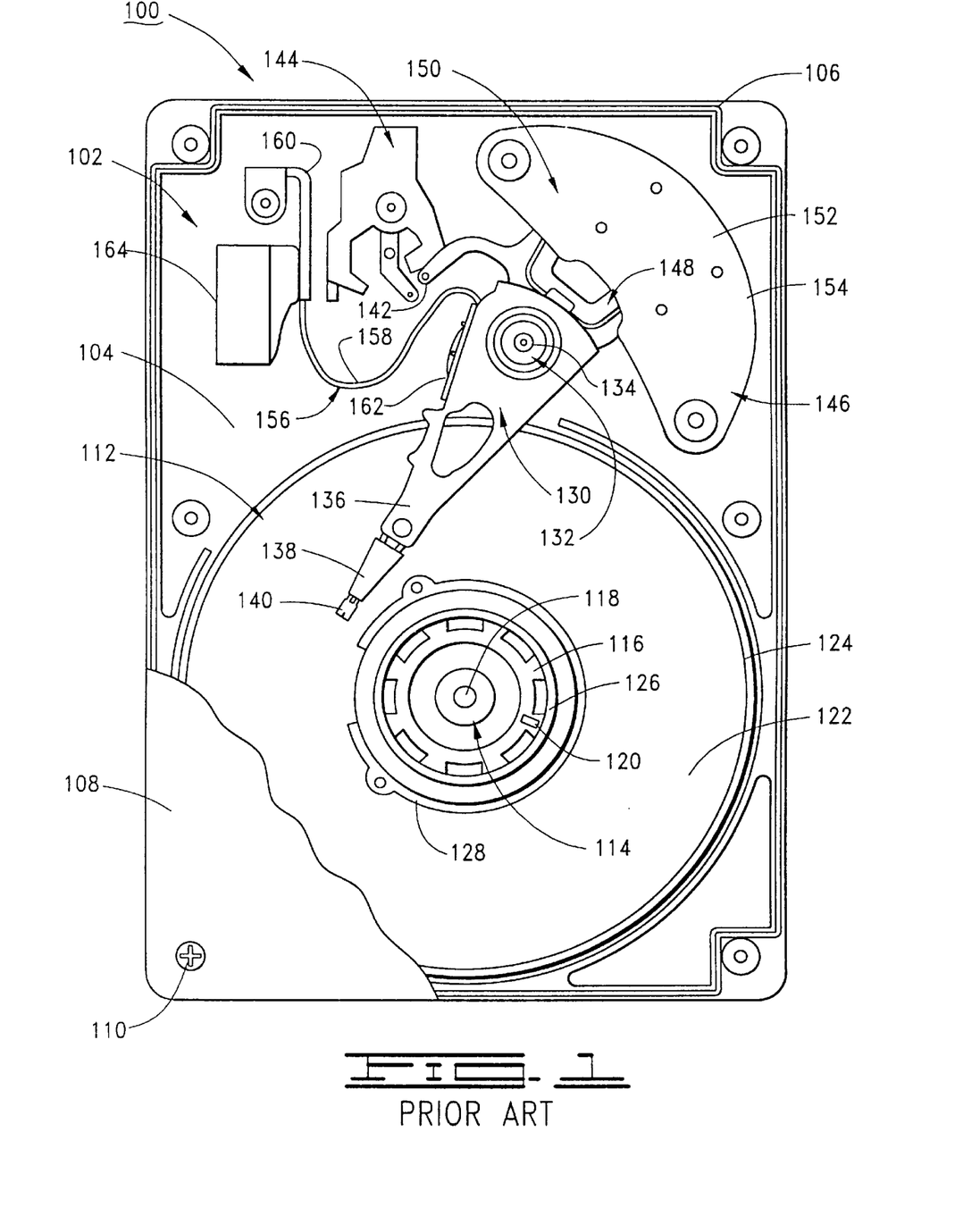
FIG. 1 is a top plan view of a disc drive constructed in accordance with the prior art.

Referring to the drawings in general, and more particularly to FIG. 1, shown therein is a top plan view of a typical prior art disc drive 100 in which the present invention is especially useful. The disc drive 100 includes a head disc assembly (HDA) 102, which includes a basedeck 104 to which various disc drive components are mounted, a gasket 106, a top cover 108 (partially cutaway), and fasteners 110, which together with the basedeck 104, provide a sealed internal environment for the HDA 102. The top cover 108 is shown partially cut-away to expose selected components of interest. The top cover 108 is mounted to the basedeck 104 in a plurality of locations about the perimeter of the top cover 108 by the fasteners 110. It will be understood that numerous details of construction of the disc drive 100 are not included in the following description as such are well known to those skilled in the art and are unnecessary for the purpose of describing the present invention.

Mounted to the basedeck 104 is a disc pack assembly 112, which comprises: a spindle motor assembly 114, the spindle motor assembly 114 having a spindle motor hub 116, a central aperture 118 and a timing mark 120. A plurality of discs 122 (having guard band tracks 124) are mounted to the spindle motor hub 116 and secured by a clamp ring 126 for rotation at a constant high speed. Additionally, the clamp ring 126 provides a mounting surface for a balance shim 128. Adjacent the discs 122 is an actuator assembly 130 which pivots about a cartridge bearing assembly 132 in a rotary fashion. The cartridge bearing assembly 132 has a central aperture 134 used in assembly of the HDA 102. The actuator assembly 130 includes a plurality of actuator arms 136 (only one shown) that support load arm assemblies 138. Each of the load arm assemblies 138 supports a read/write head 140, with each of the read/write heads 140 corresponding to a surface of one of the discs 122. As mentioned hereinabove, each of the discs 122 has a data recording surface divided into concentric circular data tracks, and the read/write heads 140 are positionably located over data tracks to read data from, or write data to, the tracks.

The actuator assembly 130 is controllably positioned by way of a voice coil motor assembly (VCM) 146, which comprises an actuator coil assembly 148 immersed in the magnetic field generated by a magnet assembly 150. The magnet assembly 150 is mounted to the basedeck 104 and to the top cover 108 via mounting apertures 152 located in a pole piece 154, a magnetically permeable flux path (such as a steel plate) mounted above the actuator coil assembly 148 to complete the magnetic circuit of the VCM 146. When controlled DC current is passed through the actuator coil assembly 148, an electromagnetic field is set up which interacts with the magnetic circuit of the VCM 146 to cause the actuator coil assembly 148 to move relative to the magnet assembly 150 in accordance with the well-known Lorentz relationship. As the actuator coil assembly 148 moves, the actuator assembly 130 pivots about the cartridge bearing assembly 132, causing the read/write heads 140 to move across the surfaces of the discs 122, thereby positioning the read/write heads 140 to interact with the data tracks of the discs 122, including the outer most readable guard band track 124.

Included as part of the actuator assembly 130 is a latch pin 142 which engages an actuator latch assembly 144 to secure the actuator assembly 130 when the disc drive 100 is powered down.

The cartridge bearing assembly 132 is secured to the basedeck 104 and to the top cover 108 by screws threaded into the central apertures 134 located in the top and bottom of the cartridge bearing assembly 132. The central aperture 134 located on the top surface of the cartridge bearing assembly 132 can be used as a reference point during the production process.

To provide the requisite electrical conduction paths between the read/write heads 140 and the disc drive read/write circuitry (not shown), read/write head wires (not separately shown) are routed on the actuator assembly 130 from the read/write heads 140, along the load arm assemblies 138 and the actuator arms 136, to a flex circuit assembly 156. The flex circuit assembly 156 is comprised of a flex circuit 158, a flex circuit mounting bracket 160, a printed circuit board (PCB) 162 and a disc drive PCB connector 164. The read/write head wires are secured by way of a suitable soldering process to corresponding pads of the PCB 162. The flex circuit 158 is connected to the flex circuit mounting bracket 160 in a conventional manner which in turn is connected by the disc drive PCB connector 164 through the basedeck 104 to a disc drive PCB (not shown) mounted to the underside of the basedeck 104. The disc drive PCB provides the disc drive read/write circuitry to control the operation of the read/write heads 140, as well as other interface and control circuitry for the disc drive 100.

Figure 2:
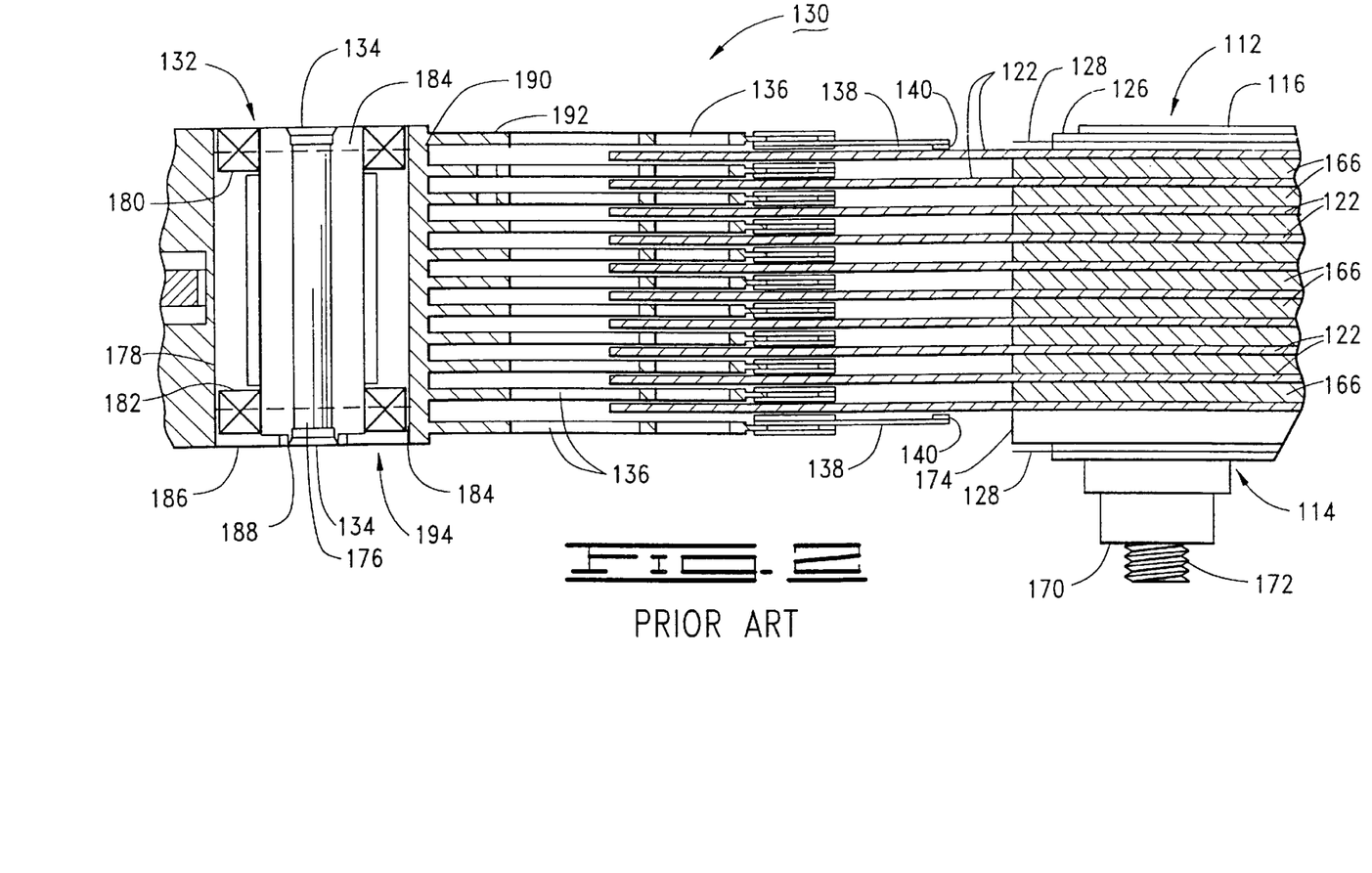
FIG. 2 is a semi-detailed diagrammatical representation and partially cutaway side view of the actuator assembly and disc pack of the prior art disc drive of FIG. 1.

FIG. 2 provides a side view of the disc pack assembly 112 showing it to be comprised of the spindle motor assembly 114, the discs 122, a plurality of spacer rings 166, the clamp ring 126, and the balance shims 128. The spindle motor assembly 114 additionally comprises a spindle motor datum 170 surface and a threaded barrel 172; further, the spindle motor hub 116 has a flange 174. The discs 122 and the spacer rings 166 are interstacked on the spindle motor hub 116, the bottom disc 122 positioned to rest on the flange 174 with one of the spacer rings 166 positioned adjacent to and resting on the bottom disc 122. Following completion of the stack of discs 122 and spacer rings 166, the clamp ring 126 is thermally expanded to pass over the external diameter of spindle motor assembly 114 while a compressive force sufficient to constrain any movement of the discs 122 and the spacer rings 166 is applied to the disc pack assembly 112. While the disc pack assembly 112 is under load and the clamp ring 126 is securely in position adjacent the top surface of the top disc 122 around the external diameter of spindle motor assembly 114, the clamp ring 126 is cooled to shrink to the spindle motor hub 116 to maintain the clamping force on the disc pack assembly 112.

Following the installation of the clamp ring 126, a balance measurement is performed on the disc pack assembly 112, and correctable imbalance conditions present in the disc pack assembly 112 are corrected by the attachment of the balance shims 128 attached to the spindle motor hub 116 and to the clamp ring 126.

FIG. 2 also shows the spatial relationship of the actuator assembly 130 relative to the disc pack assembly 112. The cartridge bearing assembly 132 (depicted diagrammatically) is a conventional component utilized in prior art disc drives and need not be described in detail herein except as follows. The cartridge bearing assembly 132 has a hollow, inner cartridge member 176 and a hollow, outer cartridge housing 178 which are coaxially disposed and separated by a top bearing 180 and a lower bearing 182. Upper and lower cartridge bearing shoulders 184 are formed as depicted, and labyrinth seals 186 are provided to seal the open ends of the cartridge bearing assembly 132. As noted above, screw members (not shown) secure the inner cartridge member 176 to the basedeck 104 and to the top cover 108 via the threaded central apertures 134. The lower surface of the cartridge bearing assembly 132 serves as a cartridge bearing datum 188.

The actuator assembly 130 comprises an E-block 190 which is a cast, precision machined member comprising a central body member 192 having a central bore 194 sized to be received over, and supported on, the outer cartridge housing 178. The E-block 190 is comprised of the aforementioned actuator arms 136 which support the load arms 138 and the read/write heads 140 (only two of each shown in FIG. 2).

A significant objective of a mechanical design of the HDA 102 is the elimination or minimization of the sources of read/write head oscillation. During operation, the read/write heads 140 are isolated from the discs 122 by the air bearings that develop between the read/write heads 140 and the surfaces of the discs 122 as a result of the spinning motion of the discs 122 by the spindle motor 114. The read/write heads 140 are directly coupled to the load arms 138, which in turn are directly coupled to the rigid actuator arms 136 of the E-block 190, the mechanical interface between the E-block 190 and the cartridge bearing assembly 132 is a critical link in propagating read/write head oscillation sources.

The mounting and alignment of the cartridge bearing assembly 132 relative to the E-block 190 is one of the most critical mechanical interfaces and alignments of the HDA 102. Since the cartridge bearing assembly 132 establishes the mechanical connection between the actuator assembly 130 and the balance of the HDA 102, the vertical position of the E-block 190, relative to the cartridge bearing datum 188 of the cartridge bearing assembly 132, establishes the primary vertical positioning of the read/write heads 140 relative to the discs 122.

With respect to the mechanical path conducted oscillation of the read/write heads 140, the air bearings decouple the mechanical path between the read/write heads 140 and the discs 122. The linked direct couple of the read/write heads 140 to the E-block 190 defines the interface between the E-block 190 and the cartridge bearing assembly 132 as the remaining mechanical path, making the selection of methods of securing the E-block/cartridge bearing assembly interface key to the design and manufacture of the actuator assembly 130.

Prior art attempts at optimizing the E-block/cartridge bearing assembly interface have included press-fitting the cartridge bearing assembly into E-block; adhering the cartridge bearing assembly to the E-block; and securing the cartridge bearing assembly to the E-block by means of mounting hardware. As is well known in the art, it has been demonstrated that to minimize mechanical path transmitted resonance induced read/write head oscillations, minimum contact between the cartridge bearing assembly and the E-block is preferred. To attain minimum contact the attachment methods primarily used in disc drive manufacturing incorporates either adhesives or mounting hardware.

Figure 3:
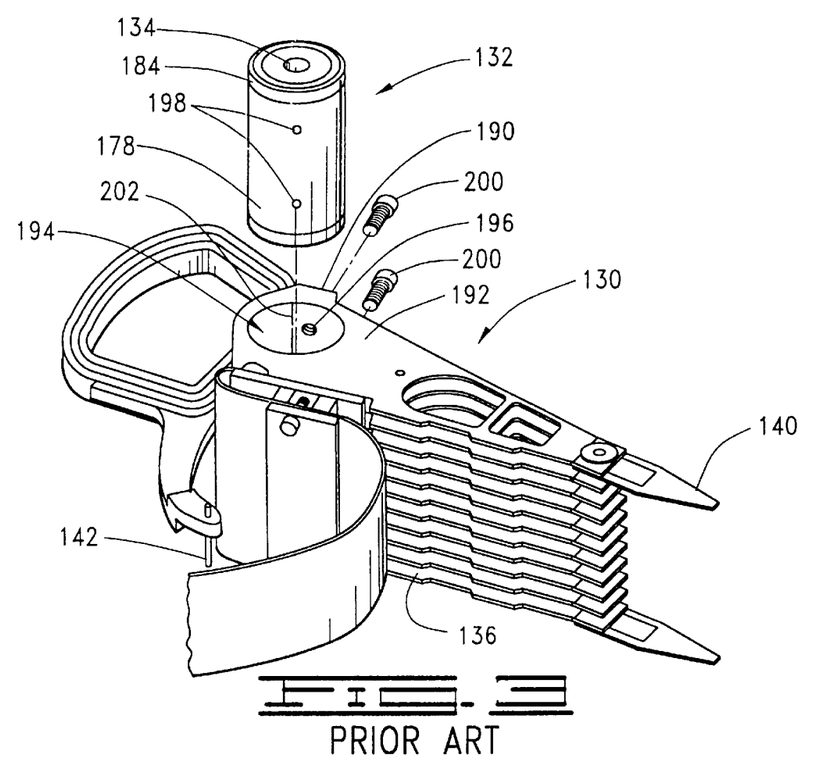
FIG. 3 is a perspective view of a portion of the actuator assembly and the cartridge bearing assembly of the prior art disc drive of FIG. 1.

Referring now to FIG. 3, shown therein is a perspective, semi-detailed view of the prior art actuator assembly 130 and the cartridge bearing assembly 132. The cartridge bearing assembly 132 is shown removed from an above the central bore 194 of the E-block 190. The central body member 192 of the E-block 190 has a pair of cartridge bearing mounting apertures 196 (only one shown) that extend through the wall and communicate with the central bore 194. A corresponding pair of threaded mounting apertures 198 are provided in the cartridge bearing housing 178. A pair of cartridge bearing mounting screws 200 pass through the cartridge bearing mounting apertures 196 and threadingly engage the mounting apertures 198 in the outer cartridge housing 178 to firmly secure the E-block 190 to the cartridge bearing assembly 132.

Figure 4:
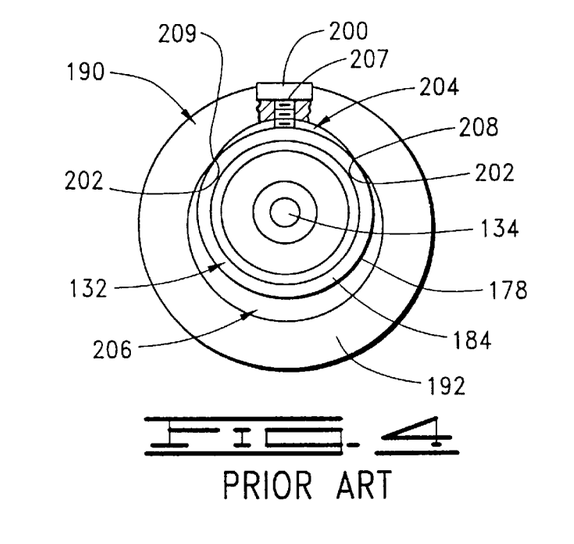
FIG. 4 is a semi-detailed top view representation of the attachment of the actuator assembly and the cartridge bearing assembly of FIG. 3.

The rotational position of the E-block 190 relative to the cartridge bearing assembly 132 is fixed and a specific alignment of the mounting apertures 198 of the cartridge bearing assembly 132 and the cartridge bearing mounting apertures 196 of the E-block 190 is required. The central bore 194 of the E-block 190 is a compound bore that has a pair of cartridge bearing alignment edges 202 that extend the length of the central bore 194. This is also shown in FIG. 4 which is a semi-detailed top view representation of the central body member 192 of the E-block 190 as such will appear when attached to the cartridge bearing assembly 132. The cartridge bearing alignment edges 202 are formed by the process of cutting away a portion of the inner wall of the central bore 194 of the E-block 190 to form a relief area 204. As the cartridge bearing mounting screws 200 pass through the mounting apertures and are extended into the central bore 194 to threadingly engage the mounting apertures 198 of the cartridge bearing assembly 132, the cartridge bearing assembly 132 is pulled against the pair of cartridge bearing alignment edges 202 which provide contact edges against the upper and lower cartridge bearing shoulders 184 of the outer cartridge housing 178 when the E-block 190 is mounted over the cartridge bearing assembly 132. With the E-block 190 mounted to the cartridge bearing assembly 132, only the cartridge bearing shoulders 184 of the cartridge bearing assembly 132 are in direct contact with the E-block 190. Along with the contact of cartridge bearing mounting screws 200 passing through the cartridge bearing mounting apertures 196 to engage the mounting apertures 198 of the cartridge bearing assembly 132 and are torqued securely to press the E-block 190 against the cartridge bearing assembly 132, the only remaining mechanical path transmitted resonance induced read/write head oscillations source is the contact made between the cartridge bearing shoulders 184 and the alignment edges 202.

When an adhesive is used to secure the cartridge bearing assembly to the E-block, failure of the adhesive to wick around and fill the gap between the cartridge bearing assembly and the E-block results in gaps that allow relative motion between the E-block 190 and the cartridge bearing assembly 132 that translates into unwanted read/write head movement. Additionally adhesives pose such problems as the inability to rework defective actuator assemblies; the inability to adjust the position of the E-block relative to the cartridge bearing assembly after the adhesive has cured; and the need for a fixture intensive manufacturing process.

A localization of holding forces occurs when using the cartridge bearing mounting screws 200 to secure the E-block 190 to the cartridge bearing assembly 132, as illustrated in FIG. 4 which shows that a gap 206 (which is exaggerated in this figure). The placement of the cartridge bearing mounting screws 200 relative to the E-block 190 and the cartridge bearing assembly 132 in the construction above described causes the cartridge bearing mounting screws 200 to pull the cartridge bearing shoulders 184 securely against the cartridge bearing alignment edges 202 of the E-block 190. The result of this configuration is that all the holding force resides primarily on one side of the cartridge bearing assembly 132 and the E-block 190. It is this problem to which the present invention is addressed.

Referring to FIG. 4, a force triangle is defined by reference points 207, 208 and 209. Reference point 207 represents the tensile load being applied by the cartridge bearing mounting screws 200 to the cartridge housing 178. Reference points 208 and 209 represent the compressive loads between the cartridge bearing shoulders 184 of the cartridge bearing assembly 132 and the cartridge bearing alignment edges 202 of the E-block 190. Again, the result of this configuration is that all the holding force resides primarily on one side of the cartridge bearing assembly 132 and the E-block 190, permitting a change of position of the E-block 190 relative to the stationary cartridge bearing assembly 132 (which is fixed via screws in the central apertures 134 to the basedeck 104 and the top cover 108) as gap 206 permits when the mass of the actuator assembly 130 rotates about the cartridge bearing assembly 132. This prior art configuration has been known to propagate a specific resonant mode of issue to the optimum performance of the disc drive.

Figure 5:
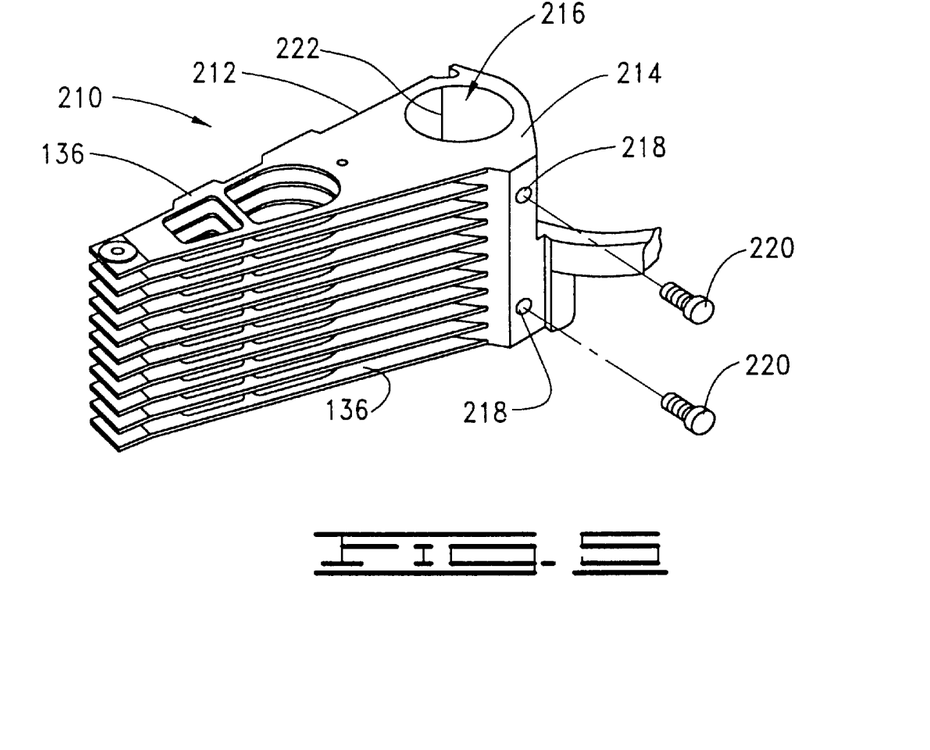
FIG. 5 is a perspective view of a portion of an actuator assembly constructed in accordance with the present invention.

Referring now to FIG. 5, shown therein is a perspective, semi-detailed view of a portion of an actuator assembly 210 which is constructed in accordance with the present invention. Except as will be specifically pointed out, the actuator assembly 210 is substantially identical to the above described prior art actuator assembly 130 so the same numerical designations appear in FIG. 5 where the component portions of each are identical. The actuator assembly 210 has a modified E-block 212 having a central body member 214 with a central bore 216. The central body member 214 has at least one threaded cartridge bearing mounting aperture 218 that extend through the wall and communicate with the central bore 216. At least one cartridge bearing mounting screw 220, also referred to herein as containment members, are threaded into the cartridge bearing mounting apertures 218 and extend into the central bore 216 to press against the outer cartridge housing 178 of the cartridge bearing assembly 132.

It should be noted that no threaded mounting apertures are necessary for the outer cartridge housing of the cartridge bearing assembly, like the threaded mounting apertures 198 of the cartridge bearing assembly 132 described above.

The central bore 216 of the E-block 212 in FIG. 5 is a compound aperture having a pair of cartridge bearing alignment edges 222 (only one shown) which extend the length of the central bore 216. In the E-block 212 the compound central bore 216 is machined to locate the cartridge bearing alignment edges 222 at a location which is opposite to the location of the cartridge bearing mounting screws 220, as shown in FIG. 5.

Figure 6:
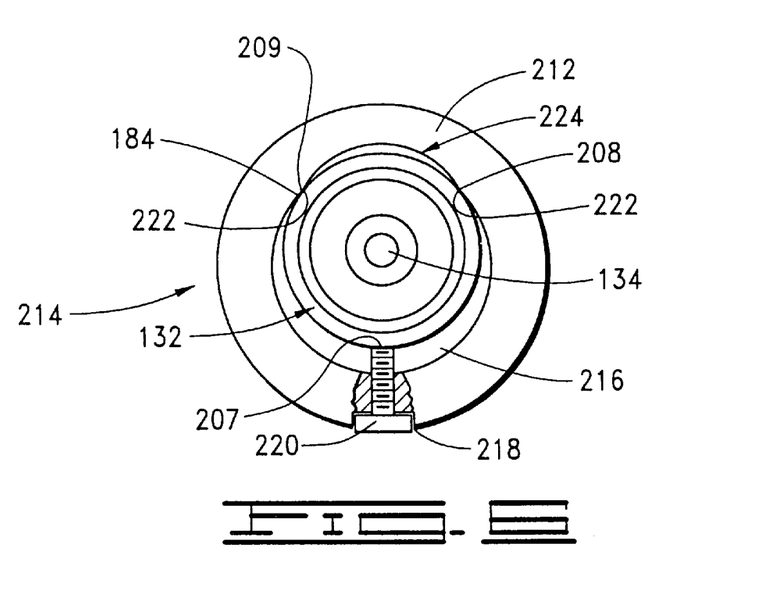
FIG. 6 is a semi-detailed top view representation of the attachment of the actuator assembly of FIG. 5 with the typical prior art cartridge bearing assembly of FIGS. 1 and 3.

This is perhaps best shown in FIG. 6 which is a semi-detailed top view representation of the central body member 214 of the E-block 212 as such will appear when attached to the cartridge bearing assembly 132. The cartridge bearing alignment edges 222 are formed by the process of cutting away a portion of the inner wall of the central bore 216 of the E-block 212 to form a relief area 224. As the cartridge bearing mounting screws 220 are threaded into the mounting apertures 218 and are extended into the central bore 216 to engage the outer cartridge housing 178 of the cartridge bearing assembly 132, the cartridge bearing assembly 132 is pushed against the pair of cartridge bearing alignment edges 222 which provide contact edges against the outer cartridge housing 178.

With the E-block 212 mounted to the cartridge bearing assembly 132, only the cartridge bearing shoulders 184 of the cartridge bearing assembly 132 are in direct contact with the E-block 212. Along with the contact of cartridge bearing mounting screws 220 passing through the cartridge bearing mounting apertures 218 to engage the outer cartridge housing 178 of the cartridge bearing assembly 132 (the screws 220 are torqued securely to press the E-block 212 against the cartridge bearing assembly 132), the only remaining mechanical path transmitted resonance induced read/write head oscillations source is the contact made between the cartridge bearing shoulders 184 and the alignment edges 202.

The position of the E-block 212 relative to the cartridge bearing assembly 132 is such as to push the cartridge bearing shoulders 184 securely against the cartridge bearing alignment edges 222 in the central bore 216 of the E-block 212. The result of this configuration is that the holding force is distributed across the entire cartridge bearing assembly 132 and strategically about the perimeter of the cartridge bearing assembly 132.

Referring to FIG. 6, force contacts between the cartridge bearing assembly 132 and the cartridge bearing mounting screws 220 of the E-block 212 result in a force triangle represented by the reference points 207, 208 and 209. Reference point 207 represents the compressive load applied by the cartridge bearing mounting screws 218 to the cartridge housing 178. Reference points 208 and 209 represent the compressive loads between the cartridge bearing shoulders 184 of the cartridge bearing assembly 132 and the cartridge bearing alignment edges 222 of the E-block 212. Again, the result of the present invention mounting configuration is the distribution of the holding forces on the entire cartridge bearing assembly 132 and the E-block 212.

The mounting configuration of the E-block 212 relative to the cartridge bearing assembly 132 in the present invention removes one of the resonant modes found to be an issue with the prior art that occurs as a result of the holding force being concentrated along one side of the cartridge bearing assembly. Additionally, the present invention results in several benefits in the disc drive 100, namely, elimination of the threaded apertures 198 in the cartridge bearing assembly 132; elimination of the need to rotationally align the cartridge bearing assembly 132 relative to the E-block 212 during assembly operations; and, the ability to subsequently adjust the position of the E-block 212 relative to the cartridge bearing assembly 132 without damaging the actuator assembly 130.

The present invention provides an improved actuator assembly (such as 130) for a hard disc drive, the actuator assembly (such as 210) being rotatably supported on a cartridge bearing assembly (such as 132) which has an outer cartridge housing (such as 178) rotatingly supported on an inner cartridge member (such as 176), the inner cartridge member secured between a basedeck (such as 104) and a top cover (such as 108). A disc pack assembly (such as 112) is supported by the basedeck and interacts with the actuator assembly for reading and writing data on discs (such as 122) on the disc pack assembly.

The actuator assembly has an E-block (such as 212) which has a central body member (such as 214) with a central bore or aperture (such as 216) which is sized to be disposed over and attached to the outer cartridge housing of the cartridge bearing assembly. The central bore has a pair of cartridge bearing alignment edges (such as 222) and at least one containment member or mounting screw (such as 220) in pressing engagement with the cartridge bearing assembly when the E-block is mounted to the cartridge bearing assembly.

The containment members press the cartridge bearing assembly against the cartridge bearing alignment edges which form line contacts against the containment members and a compressive load against the cartridge bearing assembly sufficient to maintain alignment between the E-block and the cartridge bearing assembly. By balancing the compressive load over the mount and center of gravity of the actuator assembly one of the resonant modes at issue encountered with prior art actuator assemblies is prevented or minimized.

It is clear that the present invention is well adapted to attain the ends and advantages mentioned as well as those inherent therein. While a presently preferred embodiment of the invention has been described for purposes of the disclosure, it will be understood that numerous changes may be made which will readily suggest themselves to those skilled in the art and which are encompassed within the spirit of the invention disclosed and as defined in the appended claims.

What is claimed is:

1. An actuator assembly for use in a disc drive having a cartridge bearing assembly comprising:
    (a) an E-block rotationally supported by the cartridge bearing assembly, the E-block having a central body member having a substantially vertical cartridge bearing bore with a pair of cartridge bearing alignment edges and at least one containment member aperture opposite the cartridge bearing alignment edges, wherein the containment member aperture extends horizontally through the central body member, and
    (b) at least one containment member inserted horizontally through the containment member aperture to secure the E-block to the cartridge bearing assembly at the cartridge bearing alignment edges, the containment member providing a frictional load against the containment member aperture and a compressive load against the cartridge bearing assembly sufficient to rigidly maintain alignment of the E-block and the cartridge bearing assembly.

2. The actuator assembly of claim 1 wherein the cartridge bearing assembly has an outer cartridge housing having an upper cartridge bearing shoulder and a lower cartridge bearing shoulder, and wherein the cartridge bearing alignment edges contacts against the upper cartridge bearing shoulder and the lower cartridge bearing shoulder.

3. The actuator assembly of claim 2 wherein the contacts formed by the cartridge bearing alignment edges and the upper cartridge bearing shoulder and the lower cartridge bearing shoulder are under a secondary compressive load provided through the center of gravity of the compressive load provided by the at least one containment member to the cartridge bearing assembly to balance the compressive load over the center of gravity.

4. The actuator assembly of claim 1 wherein, the containment member comprises a mounting screw which threadingly engages the containment member aperture.

5. A disc drive assembly, comprising:
    a basedeck;
    a spindle motor supported by the basedeck;
    at least one disc having a disc data surface;
    a cartridge bearing assembly supported by the basedeck; and
    actuator assembly supports at least one read/write head in data transmission relationship to the disc data surface, the actuator comprising an E-block having a central body member with a vertically oriented cartridge bearing aperture including at least two vertically oriented cartridge bearing alignment edges, a plurality of horizontally oriented containment member apertures and a plurality of horizontally oriented containment members in pressing engagement with the cartridge bearing assembly when mounted to the cartridge bearing assembly so that the containment members press the cartridge bearing assembly against cartridge bearing alignment edges forming a contact against the containment members and provides a compressive load against the cartridge bearing assembly sufficient to maintain alignment between the E-block and cartridge bearing assembly.

6. The disc drive of claim 5 wherein the cartridge bearing assembly has an upper cartridge bearing shoulder and lower cartridge bearing shoulder, and wherein the only direct contacts with the E-Block and the cartridge bearing assembly are contacts at the upper cartridge bearing shoulder and the lower cartridge bearing shoulder with the cartridge bearing alignment edges.

7. The disc drive of claim 6 wherein the center of gravity of the cartridge bearing assembly is coincident with the center of gravity for the actuator assembly.

8. The disc drive of claim 7, wherein the compressive load provided by the containment members is balanced over the mount and the center of gravity of the actuator assembly.

9. The disc drive of claim 5 wherein, each of the plurality of containment members comprises a mounting screw which threadingly engages each of the plurality of containment members apertures.

* * * * *